3,036,097
QUATERNARY AMMONIUM SALTS OF 20β-AMINO-ALLOPREGNANE-3β-OL
Percy George Holton, Mexico City, Mexico, assignor to Syntex S.A., Mexico City, Mexico, a corporation of Mexico
No Drawing. Filed July 6, 1961, Ser. No. 122,084
3 Claims. (Cl. 260—397.5)

The present invention relates to novel cyclopentanophenanthrene compounds and to a process for the production thereof.

More particularly the present invention relates to novel quaternary ammonium salts of 20β-amino-allopregnan-3β-ol.

The novel compounds of the present invention which are valuable hypotensive agents and muscle relaxants with ganglionic blocking activities, are represented by the following formula:

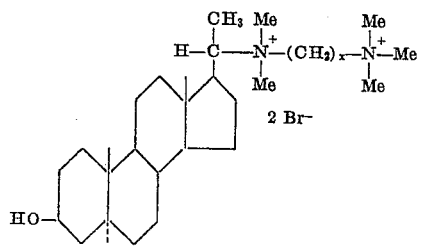

In the above equation Me represents the methyl group; X may be a number from 3 to 6 inclusive.

The products of the present invention are prepared by the process illustrated by the following equation:

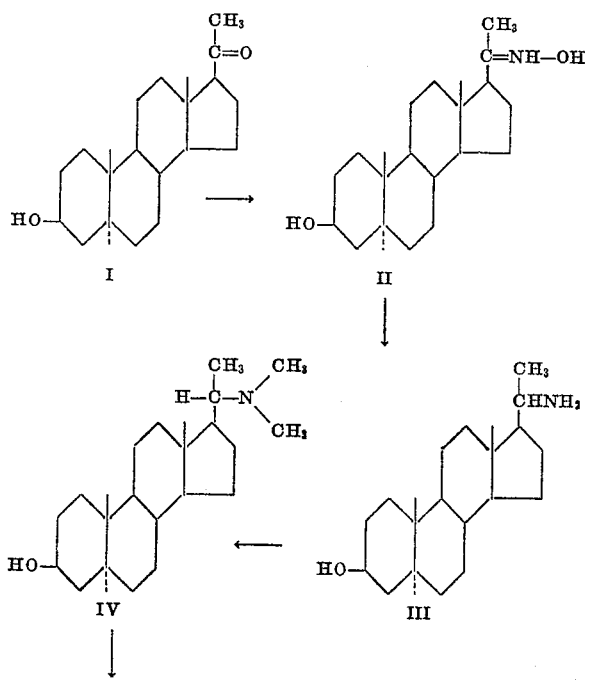

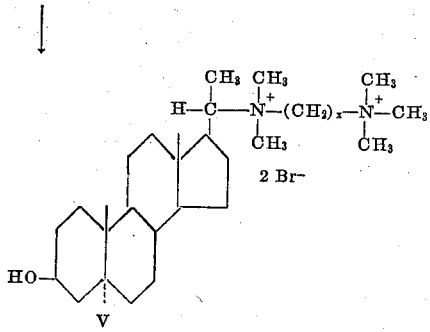

In the above formulas X has the same meaning as above set forth.

In practicing the process outlined above, the starting compound allopregnan-3β-ol-20-one (I) is conventionally treated with hydroxylamine hydrochloride affording the corresponding oxime (II) which upon reduction with sodium-ethanol furnishes 20β-amino-allopregnan-3β-ol (III).

This compound is refluxed with formic acid and formaldehyde for a period of time of the order of 2 hours to give 20β - N,N-dimethylaminoallopregnan-3β-ol (IV). Upon treatment of this compound with a (ω-bromoloweralkyl) trimethyl-ammonium-bromide, in a suitable solvent such as acetonitrile, there is obtained the corresponding 20β-N-(N',N'-dimethylaminoloweralkyl) - N-methylamino-allopregnan-3β-ol-bis-methobromide (V).

The following specific examples serve to illustrate but are not intended to limit the present invention:

*Example I*

A mixture of 1 g. of allopregnan-3β-ol-20-one, 2 g. of hydroxylamine hydrochloride, and 2 g. of sodium acetate in 200 cc. of 80% methanol is heated under reflux for 20 hours. 100 ml. of water were added and the mixture was evaporated under reduced pressure until the appearance of crystals. After cooling, the formed crystals were filtered off and dried, thus affording the allopregnan-3β-ol 20-one oxime.

To a refluxing solution of this oxime in 100 cc. of n-butanol were added portionwise 5 g. of sodium. The resulting solution was diluted with 100 cc. of water, acidified with acetic acid and evaporated under reduced pressure until the butanol had been removed. The acidic solution was washed with ether, made alkaline with a 5% aqueous sodium hydroxide solution, the liberated product extracted with methylene chloride, the extract washed with water, dried over anhydrous sodium sulfate and evaporated to dryness. Recrystallization from acetone afforded 20β-amino-allopregnan-3β-ol.

*Example II*

1 g. of this last steroid was refluxed with 3 cc. of 90% formic acid and 2.5 cc. of 40% formaldehyde for 2 hours. The mixture was evaporated under reduced pressure, the residue alkalized with sodium carbonate solution and the resulting mixture extracted with ether. The extract was washed with water, dried over sodium sulfate and evaporated to dryness. Recrystallization from ethanolbenzene afforded 20β-(N,N-dimethylamino)-allopregnan-3β-ol.

Example III

A mixture of 1 g. of the foregoing compound, 2 g. of (γ-bromopropyl)-trimethyl ammonium bromide, and 10 cc. of acetonitrile was refluxed for 24 hours, then cooled and diluted with ether. The precipitate thus formed was collected and recrystallized from methanol giving 20β-N-(N',N'-dimethylaminopropyl)N - methylamino - allopregnan-3β-ol-bis-methobromide.

Example IV 1 g. of 20β-(N,N-dimethylamino)-allopregnan-3β-ol was treated following the technique described in Example III except that (γ-bromo-propyl)-trimethyl-ammonium bromide was substituted by (δ-bromobutyl)-trimethyl-ammonium bromide thus affording 20β-N-(N',N'-dimethylaminobutyl)-N-methylamino - allopregnan - 3β - ol-bis-methobromide.

I claim:
1. A compound of the following formula:

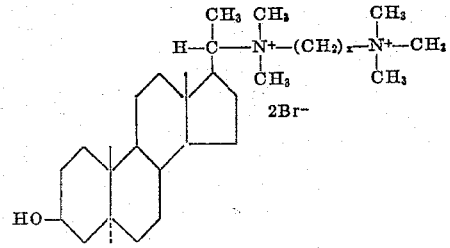

wherein X is an integer from 3 to 6.

2. 20β - N-(N',N' - dimethylaminopropyl)-N - methylamino-allopregnan-3β-ol-bis-methobromide.

3. 20β - N - (N',N'-dimethylaminobutyl)-(N - methylamino-allopregnan-3β-ol-bis-methobromide.

No references cited.